US011255446B1

(12) United States Patent
Harrel et al.

(10) Patent No.: US 11,255,446 B1
(45) Date of Patent: Feb. 22, 2022

(54) GREASE SYSTEM FOR HIGH PRESSURE PLUG VALVES

(71) Applicant: BlueCore Completions, LLC, Midland, TX (US)

(72) Inventors: Travis Harrel, Midland, TX (US); Matthew J. Jerz, Midland, TX (US); Christian Leuchtenberg, Singapore (SG)

(73) Assignee: BlueCore Completions, LLC, Midland, TX (US)

( * ) Notice: Subject to any disclaimer, the term of this patent is extended or adjusted under 35 U.S.C. 154(b) by 160 days.

(21) Appl. No.: 16/748,386

(22) Filed: Jan. 21, 2020

Related U.S. Application Data

(60) Provisional application No. 62/794,954, filed on Jan. 21, 2019.

(51) Int. Cl.
| | | |
|---|---|---|
| *F16N 11/10* | (2006.01) | |
| *F16K 5/22* | (2006.01) | |
| *F16N 25/00* | (2006.01) | |
| *F16N 7/38* | (2006.01) | |
| *E21B 34/02* | (2006.01) | |
| *E21B 10/24* | (2006.01) | |

(52) U.S. Cl.
CPC ............. *F16K 5/225* (2013.01); *F16N 7/385* (2013.01); *F16N 11/10* (2013.01); *F16N 25/00* (2013.01); *E21B 10/246* (2013.01); *E21B 34/02* (2013.01)

(58) Field of Classification Search
CPC .......... F16K 5/225; F16N 13/22; F16N 25/00; F16N 7/385; F16N 11/10; F16N 11/00; F16N 2250/18; F16N 2210/28; F16N 2280/00; E21B 10/246; E21B 10/24; E21B 34/02
See application file for complete search history.

(56) References Cited

U.S. PATENT DOCUMENTS

| | | | | |
|---|---|---|---|---|
| 1,837,572 | A * | 12/1931 | Morse | ........................ F16N 5/02 417/404 |
| 9,206,915 | B2 * | 12/2015 | Croci | ....................... F16N 21/04 |
| 10,100,978 | B2 | 10/2018 | Gouge | |
| 10,941,902 | B2 * | 3/2021 | Harrel | ....................... F16K 3/36 |
| 2017/0146189 | A1 | 5/2017 | Herman et al. | |
| 2019/0360637 | A1 * | 11/2019 | McKim | .................... F16N 13/22 |

\* cited by examiner

*Primary Examiner* — Umashankar Venkatesan
*Assistant Examiner* — Andrew J Rost

(57) ABSTRACT

A system for distributing high viscosity grease to at least one plug valve includes a replaceable cartridge with a body having a chamber and a piston disposed within the chamber. The piston defines a first space within the chamber for receiving solid grease and a second opposing space within the chamber for receiving fluid for driving the piston to compress the solid grease received within the first space. A manifold detachably couples to the replaceable cartridge and has a manifold chamber for receiving grease flowing under compression from an outlet of the cartridge and a plurality of valves in fluid communication with the manifold chamber for selectively distributing grease to corresponding grease ports of the at least one plug valve.

21 Claims, 3 Drawing Sheets

GREASE SYSTEM FOR HIGH PRESSURE PLUG VALVES

CROSS-REFERENCE TO RELATED APPLICATION

The present application claims the benefit of U.S. Provisional Patent Application No. 62/794,954 filed Jan. 21, 2019; the contents of which is incorporated herein by reference in its entirety.

FIELD OF INVENTION

The present invention relates in general to fluid drilling equipment and in particular to a greasing system used for high pressure plug valves subjected to severe operating conditions, such as the high pressures, high flow rates, and abrasive fluids commonly found in hydraulic fracturing operations and other oil and gas drilling applications.

BACKGROUND OF INVENTION

In plug valves used in one of the most severe service applications known today, hydraulic fracturing ("fracing"), very high-pressure slurry is pumped through the bore at very high rates. These plug valves use extremely high viscosity grease, which is supplied in sticks that are solid at room temperature. However, the commercially available pumps used for applying stick grease are generally not well-suited to support the high-volumes required to grease plug valves during fracing operations, which results in significant downtime and forces personnel to work in a dangerous environment close to ongoing high pressure fracing operations.

In fracing, fracing slurry is forced down a wellbore with enough pressure to fracture the hydrocarbon bearing rock formations and force particulates into the resulting cracks. When the pressure is released, the particles ("proppant"), which may be sand or other high compressive strength additives such as ceramic particles and bauxite, remain in the factures (cracks) and keep the fractures open. This "mechanism" then allows pathways for hydrocarbon to flow from the rock that was previously solid. The particle size distribution in facing fluids is distributed so that the larger particles can prop open larger cracks and finer particles can prop open the very tips of the cracks, which are microscopic in nature. The particle sizes can vary from 0.004 inches to 0.01 inches (No 140 Mesh to No 8 Mesh). The pumping pressure at the valve can be up to 15,000 psi and the slurry velocity through a valve bore of 5.125 inches, as is typical of a 5⅛ inch, 15000 psi valve, is well above erosional velocity of about 50 to 70 feet per second. Moreover, the fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles remain in the valve assembly when the pressure is released. Small particles as large as 0.004 inches are within machining tolerances of the steel parts of valves and therefore will find their way into the metal sealing surfaces. With the high velocity of abrasive fracing fluid, any weakness or point of turbulence can very quickly lead to a washout of a seal area or any interface. If an area or interface adjoins the valve main body, then the life of the main valve body is severely limited.

To preserve the main moving sealing parts of plug valves and to allow them to seal effectively, very high viscosity sealing greases are injected to grease the valves, as many times as practicable on a job. Greasing forces the proppant out of the interfaces to allow effective sealing and prevents scouring of the seal surfaces with trapped particles.

For modern plug valves used in fracing operations, the general greasing procedure has remained unchanged. The valves usually have at least two or more grease ports with grease fittings installed and grease is systematically injected into the valves between fracing stages when there is a lull in activity and less pressure is on the valves. The exact procedure varies from operator to operator and changes based on the design of such plug valves.

As most valves currently used for fracing today are gate valves, and with greasing being a major operation, there are several patent applications, which disclose inventions that attempt to set up greasing manifolds and systems to simultaneously service many valves (e.g., US application US20170146189A1 assigned to General Electric). In addition, granted patent U.S. Pat. No. 10,100,978B2 discloses a grease distribution system and methods. Gate valves, however, can employ a lower viscosity grease compared to metal sealing plug valves. As such, the prior art is not suitable for proper and efficient greasing of metal sealing plug valves, where the grease acts more as a sealant due to the plug valve design.

Plug valves are proving to be a commercially viable alternative for gate valves in fracing operations and therefore there is a need for a high-volume greasing system for multiple plug valves.

SUMMARY OF INVENTION

A greasing system for high pressure plug valves that can be used continuously for multiple plug valves, as typically found on fracing stacks during fracing operations and on zipper (distribution) manifolds located between the pumping pressure source and the fracing stacks. The system can be remotely operated from a distance by actuation of distribution valves that route the grease to each valve. A cartridge system enables expedient replenishment of grease and off-site loading of grease into the cartridges in a clean environment. The quantity of grease pumped can be monitored and the pressure of grease entering the plug valve can be measured.

Advantageously, the principles of the invention provide efficient lubrication of multiple plug valves on well-sites during fracing operations, while at the same time keep personnel at a safe distance. Furthermore, multiple grease cartridges can be loaded with grease at a safe and clean location away from the fracing operations and then used for quick change out, when needed.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
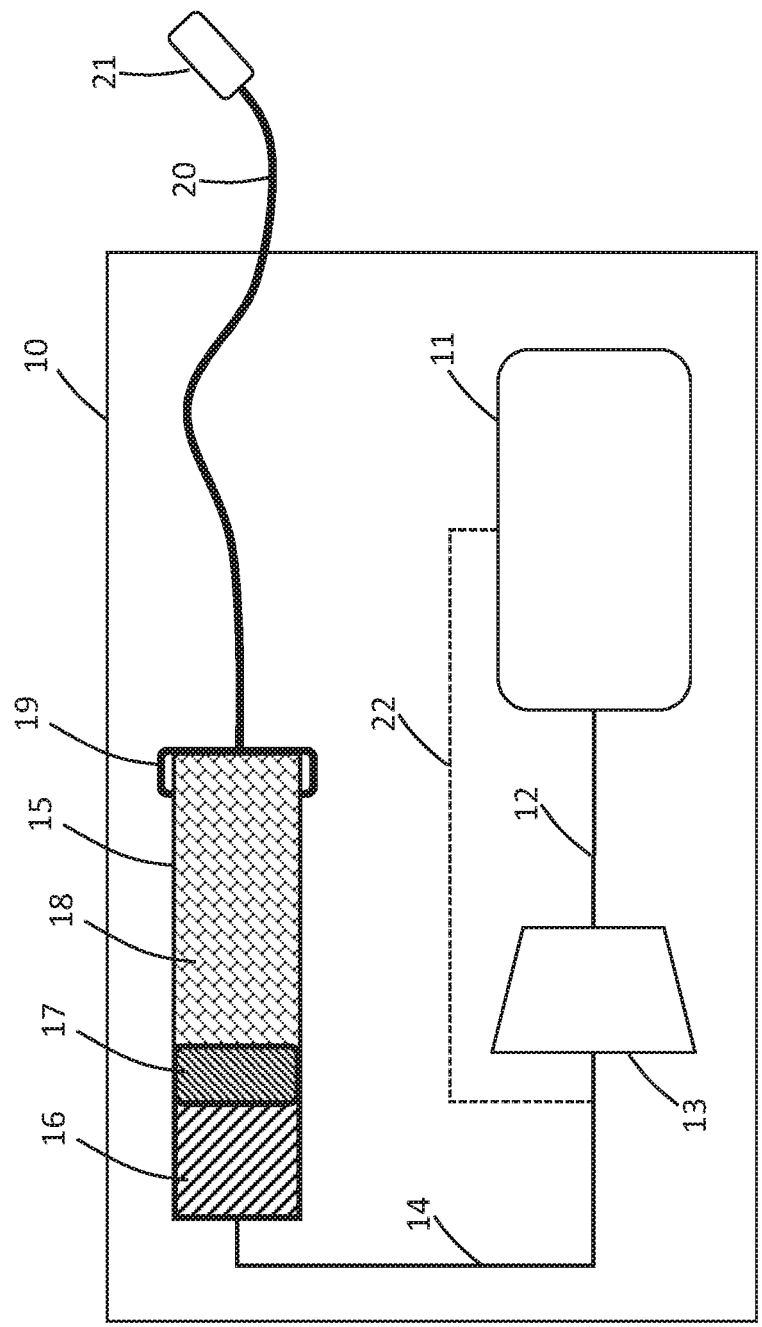
FIG. 1 is a schematic drawing of prior art stick grease pumps.
Figure 2:
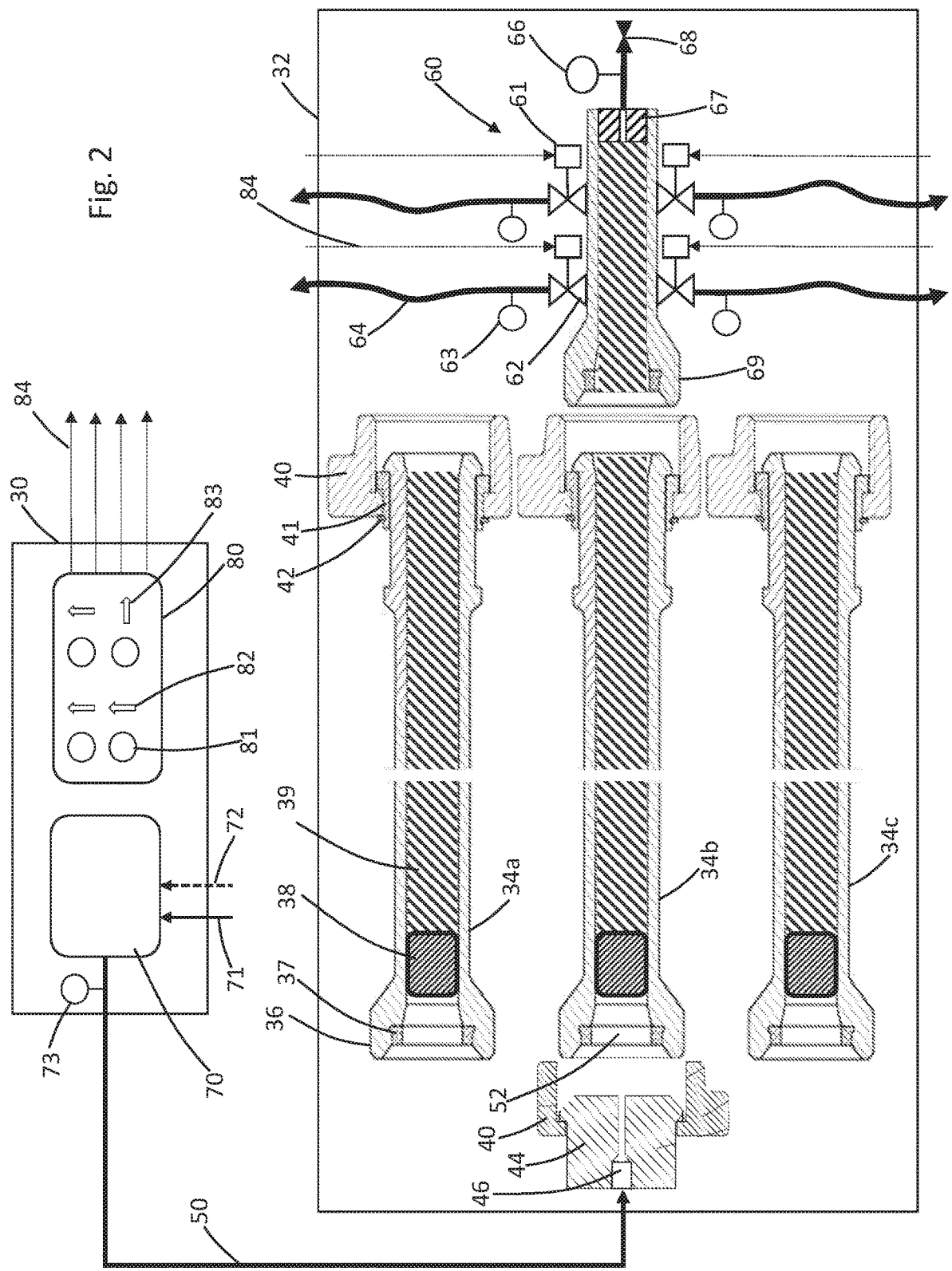
FIG. 2 is schematic drawing of a greasing system according to the inventive principles.
Figure 3:
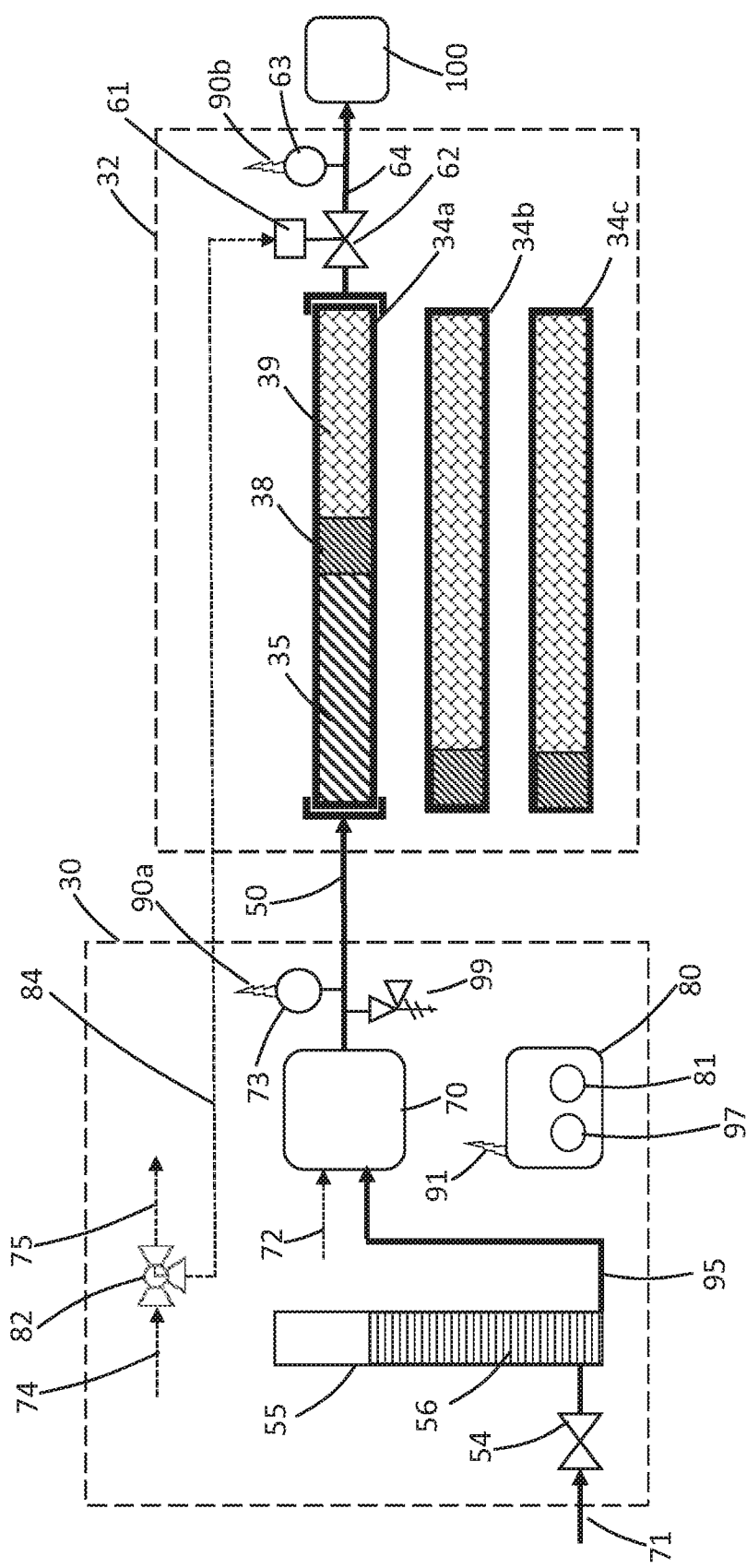
FIG. 3 is a simplified process and instrumentation drawing showing further details and variations of the greasing system of FIG. 2.

The problems being solved, and the solutions provided by the embodiments of the principles of the present invention are best understood by referring to FIGS. 1 to 3 of the drawings, in which like numbers designate like parts.

In order to describe the details of the embodiments of the present principles accurately, as well as to differentiate them from gate valve greasing systems, some grease definitions are required. Greases suitable for the operating conditions of plug valves, where a much higher viscosity is required compared to gate valves, all have NLGI consistency numbers greater than 3. The NLGI consistency number (sometimes called "NLGI grade") expresses a measure of the relative hardness of a grease used for lubrication, as specified by the standard classification of lubricating grease established by the National Lubricating Grease Institute (NLGI). NLGI's classification defines nine grades measured by ASTM standard D217, which is done after working the grease at 25 deg C. (77 deg F.). The following table gives the classification from this test:

| NGLI number | Appearance | Consistency food analog |
| --- | --- | --- |
| 000 | fluid | cooking oil |
| 00 | semi-fluid | apple sauce |
| 0 | very soft | brown mustard |
| 1 | soft | tomato paste |
| 2 | "normal" grease | peanut butter |
| 3 | firm | vegetable shortening |
| 4 | very firm | frozen yoghurt |
| 5 | hard | smooth pate |
| 6 | very hard | cheddar cheese |

Greases with NGLI numbers from 000 to 2 are easily pumped. Gate valves usually use greases in NGLI 2 format that can be pumped conventionally, as described in the prior art patents and applications. Plug valves use greases in the 3 to 6 NGLI range, which are supplied as solid sticks at room temperature and then stay solid up to temperatures of 150 deg F. It is possible under controlled conditions in a factory, with heating, to conventionally pump NGLI 3 greases. (Conventional pumping means a grease pump that has a reciprocating stroke that can self-prime with the grease as the grease is able to flow. The priming may be assisted with some air pressure on the grease container.)

In contrast, pumps for stick grease ("stick grease" being an industrial term for high NGLI grease supplied in cylindrical solid sticks) require hand loading of the sticks into a grease chamber, which has a piston driven manually or by a hydraulic pump. These types of pumps take small grease quantities, usually 14 oz. sticks, although the biggest pumps are able to load a five-pound stick of grease. The larger sticks of grease are typically enough to lubricate valves for shop purposes, but are cumbersome, particularly when multiple valves must be lubricated. At the well site, such commercially available stick grease pumps must be close to the valves being lubricated, which is an unsafe operation condition when greasing and fracing operations are being performed simultaneously as they must be manually connected to each valve grease port in turn.

Referring to FIG. 1 (Prior Art), a schematic of a commercially available pump is shown. All the parts are mounted to a compact singular frame 10, and include a reservoir 11 that feeds hydraulic oil through a conduit 12 to an air driven pressure pump 13 supplying hydraulic pressure to a cylinder 15. The cylinder 15 has hydraulic oil in compartment 16 and a piston 17. The piston 17 transmits the hydraulic pressure to grease in cavity 18, causing grease flow through a high pressure hose 20, which includes a grease fitting 21 that fits the grease port of the valve being lubricated. The end of the hose 20 will also usually have a pressure gauge and a bleed valve (not shown). The hose 20 is typically 10 feet long with a ⅜ inch bore, which results in a pressure loss of about 2000 psi along the hose length due to the high viscosity of the stick grease. Typically, these pumps have a maximum output of 10,000 psi.

A removable threaded cap 19 allows a fresh stick of grease to be installed in the cylinder 15. The design of FIG. 1 uses air pressure (not detailed) to move the piston 17 back to the starting position on the left, while opening the bleed line 22 to allow the hydraulic oil to return to the reservoir 11. This feature enables a full stick of grease to be installed. (An alternate design uses a dual acting piston design to push back the piston 17 with hydraulic fluid instead of air—not shown.) Disadvantageously, the design shown in FIG. 1 does not include an indication mechanism for amount of grease pumped, which is an important data point when field greasing valves, where the amount of grease pumped can be indicative of problems or further greasing requirements.

There are currently only two manufacturers of such pumps capable of a maximum grease load of five pounds, namely, Climax Lubricants & Equipment Co. of Houston, Tex., manufacturer of the Serpent 1800 Volume Gun, and Val-Tex of Houston, Tex., manufacturer of the QS-5000-C pump. These pumps were designed for shop lubrication of valves.

A modern fracing operation typically runs 24 hours per day for several days. In the Permian basin of Texas, 70 fracing stages per well are now common. Each stage can last 1 to 2 hours and results in a small portion of the total wellbore being fractured. Then the fracing pumps are stopped, and wireline is run. These wireline operations will do a variety of things depending on the completion system being used, for example, to set a plug, perforate a new zone, or open or close a sliding sleeve. This prepares a new section (interval) of the wellbore for fracing.

Next, a new stage is pumped, fracturing the newly exposed wellbore. This process continues until all the sections of the wellbore have been fraced. It is common to achieve 8 to 15 fracing stages in a day, rotating the activity continuously between typically 3 wells located on the same pad. With 70 stages per well, this means that the plug valves on the fracing stack or zipper manifolds are operating continuously for 14 to 28 days with over 50 to 100 open and close cycles per valve, depending on particular valve locations. To ensure the reliable performance under fracing conditions, the plug valves must be greased at regular intervals, usually between stages. Currently this is done with the commercially available pumps, such as those described above, which requires personnel in the danger zone due to the short grease hose lengths. Moreover, personnel must individually attach a grease hose to each valve grease fitting in turn, which is time consuming. Additionally, the five-pound stick of grease does not last long, thereby requiring frequent reloading of the grease cylinder. Finally, opening the grease cylinder on a wellsite increases the probability of grease contamination, which results in valve failures and non-productive time for the operators.

To overcome the operational safety issues, reduce the length of time required for greasing, and reduce the risk of contamination, one exemplary embodiment of the present inventive principles includes: a) multiple grease cylinders pre-loaded in clean conditions at the workshop, with each cylinder capable of holding four or more five-pound grease sticks; b) a drive fluid pump using water instead of hydraulic oil to conform with environmental requirements on a wellsite; c) multiple longer grease hoses with larger bores that are permanently connected to the grease fittings on the corresponding plug valves; d) multiple remotely operable grease distribution valves to enable sequential singular greasing of valves for purposes of monitoring greasing operations; e) a system for measuring the grease volume injected; and f) a system for monitoring grease injection pressure, as well as additional safety systems like overpressure relief valves.

Due to the very high-pressure loss experienced in the grease hoses due to the nature of stick grease, it is not practicable to have a singular system like the prior art shown in FIG. 1. Among other things, the drive and monitoring part of the system should be remotely located for safety of personnel, typically at least 100 feet away from the well. However, even with larger bore grease hoses, because some of them will be longer than 10 feet, to reach the higher valves on a fracing stack, the cartridges containing the grease and the drive piston must be located near the well. This is also fundamentally different from prior art greasing systems for multiple gate valves, where it is possible to have a singular system remotely located, as the much lower viscosity grease makes longer hoses practicable. The lower viscosity grease suitable for gate valves also make it possible to have a remotely located grease pump with a long grease hose leading to a distribution manifold near the well.

FIG. 2 is a schematic drawing of an embodiment of the invention. The greasing system consist of two separate skids. Skid 32 contains the grease cylinders and is located near the well. Skid 30, which contains the operational part of the greasing system and requires access by personnel, is located at least 100 feet away at a safe location. Skid 30 includes a high-pressure water pump 70, preferably an air diagram pump of the type commonly used for pressure testing, a water supply 71 and an air supply 72. Pressurized water is routed along a high-pressure hose 50 to skid 32 and the pressure of the water being pumped can be monitored at pressure gauge 73. As the medium being pumped is water, the hose can be a comparatively small-bore hose in the ¼ to ⅜ inch bore range. In winter, an antifreeze, such as glycol or methanol, may be added to the water to prevent freezing of the pump and water supply to the grease tubes.

Skid 32 includes a frame that can hold two or more grease tubes, which are preferably high-pressure cylinders 34 of a cost-effective nature. In the embodiment shown, cylinders 34 are five (5) foot long high-pressure pipes rated to 10,000 psi working pressure, which are commonly used for well service work. These pipes are of nominal size 4 inches, though any combination of length and desired bore can be used. Cylinders 34 may be pipes of the hammer union type, but can be constructed using any type of high pressure coupling that can be connected quickly, such as pressure wireline lubricators with coarse thread unions. Custom high pressure tubes could be used, but on a three-well pad, with each well associated with one such skid 32, and each skid 32 having three high pressure tubes, cost effectiveness may be reduced.

Cylinder 34a includes a female threaded connection 36, an elastomeric seal 37, and a piston 38. Cylinder 34a is shown fully filled with grease 39. A hammer union male connector 40 is attached to the cylinder 34a with inserts 41 and a snap ring 42. An embodiment of cylinder 34a constructed of four (4) inch nominal bore pipe with a five (5) foot length can hold four five-pound grease sticks giving a total load of twenty pounds of grease. Cylinders 34b and 34c are preferably identical to cylinder 34a.

Cylinders 34 are preferably filled with grease in the workshop under clean conditions and protected with end caps (not shown). While three cylinders 34 are provided in the embodiment of FIG. 2, the number of cylinders 34 on a given skid 32 may vary in actual practice. Furthermore, at the well site, many additional grease-fill cylinders 34 may be made available for quick exchange with those on the skids 32. Preferably, cylinders 34 are prepared with a piston 38 in order to have a speedy change over without the need to handle a greasy piston and risk contamination.

In operation, cylinder 34b is connected to plug 44 through a hammer union 40. (FIG. 2 shows cylinder 34b in the unconnected state for clarity.) When connected, high pressure water is pumped down hose 50 through a port 46, thereby supplying high pressure water to cavity 52. The resulting pressure is transmitted to the piston 38 and thus gives pressure to the grease 39.

The other end of the cylinder 34b is connected to a distribution manifold 60 by screwing the male hammer union 40 to the threaded female union 69 (shown disconnected for clarity). The distribution manifold 60 allows routing of grease to individual grease ports on the plug valves through corresponding lines (e.g., hoses) 64. In this example, four distribution lines 64 are shown, but in field use typically there will be at least 3 to 8 for a frac stack and 6 for a zipper manifold.

Each grease output line 64 is associated with a remote-controlled valve 62, actuated by an actuator 61, and a pressure gauge 63. The distribution manifold includes an end plug 67, with a port for bleeding through valve 68, and a pressure gauge 66. These features ensure that all pressure has been bled off prior to disconnecting hammer union 40 from threaded union 69.

In this example, each actuator 61 is spring closed and is opened with air pressure supplied down a corresponding line 84. Lines 84 connect skid 30 with skid 32, preferably through a small bore air pressure tubes. The pressure gauges 63 are preferably wireless and use battery power to transmit the pressure data to indicators 81 on skid 30. Skid 30 includes a control panel 80 that is numbered with the valve/grease output line number. A set of 3-way air valves on skid 30, including exemplary 3-way air valves 82 and 83, supply air pressure to actuators 61 on skid 32 and open the corresponding valves 62 and vent to atmosphere bleeding pressure from lines 84. The springs in actuators 61 close the corresponding valve 62 when the air pressure is removed. 3-way air valve 83 is shown in the open position and 3-way air valve 82 is shown in the closed position.

While continuously pumping with water pump 70, the individual 3-way air valves, for example 3-way air valves 82 and 83 can be opened and closed, which in turn closes and opens the valves 62 on grease distribution manifold 60. Concurrently, the grease pressure measured by pressure gauges is monitored on displays 81. Normally, one plug valve is greased at a time and it is remotely opened and closed to facilitate grease distribution. Therefore, skid 32 will normally be beside the plug valve hydraulic control panel (not shown). With this system a complete greasing operation for all the plug valves on a frac stack or zipper manifold can be carried out uninterrupted without any personnel close to high pressure.

The volume of water pumped by the high-pressure water pump 70 can be monitored with a stroke counter or other measuring device, as explained below in conjunction with FIG. 3, which allows estimation of the amount of grease pumped. From the estimation of the amount of grease pumped, a determination can be made as when to install a new loaded grease cylinder 34. For example, once grease cylinder 34a is empty, or almost empty, it can be disconnected from plug 44 and grease manifold 60 and a fresh full grease cylinder 34b or 34c can be installed. This system removes the arduous and potentially dangerous task of individually connecting a grease pump, such as shown in FIG. 1, to each valve in turn, with personnel close to the high pressure fracing stack or zipper manifold and replacing single five-pound grease sticks in the field.

FIG. 3 is a process and instrumentation diagram that shows the embodiment of FIG. 2 in further detail, along with some enhancements. In this embodiment skid 32, supports an operational cylinder 34a with the piston 38 half way down the cylinder and grease cylinders 34b and 34c fully loaded and ready for substitution. Pressure sensor 63 has an antenna 90b for wireless data transmission. For clarity, FIG. 3 only shows one grease distribution line 64 connected to an exemplary plug valve 100.

On skid 30, the 3-way air valve 82 includes an air supply 74 and a vent to atmosphere 75. In this embodiment, 3-way air valve 82 is an L-port 3-way valve. Pressure sensor 73 for water output pressure has an antenna 90a for wireless data transmission. Both antennas 90a and 90b transmit back to the control panel 80, which receives via antenna 91 and their pressure data can be displayed there on displays 97 and 81 respectively. A high-pressure relief valve 99 is connected to the line 50. FIG. 3 is illustrative of a system with multiple pressure sensors, displays and safety features according to the inventive principles.

FIG. 3 schematically illustrates an alternative method to a pump stroke counter, for monitoring the amount of grease pumped or remaining in the current grease cylinder 34. In this example, an empty vertical cylinder 55 on skid 30, made from plexiglass or other clear material, has a slightly larger volume than the grease volume of the cylinders 34 on skid 32. The top-vented cylinder 55 is filled from a water supply 71 through valve 54 up to a mark that shows the full volume of grease in the cylinder 34 currently being used. Valve 54 is then closed and the pump 70 takes suction through line 95. As the water volume 56 in the cylinder 55 drops, the level is indicative of the volume of grease pumped as indicated by graduations along the cylinder. Alternatively, the cylinder 55 can also be opaque and have a float or magnetic indicator or other typical sight glass indication mechanism. This allows a simple direct correlation of grease volume remaining which is important on a busy wellsite where pump stroke counts may be forgotten or misinterpreted.

In an alternate embodiment, at least two grease lines 64 are connected to each plug valve 100 and the grease manifold 60 valves are left open while supplying a constant pressure from pump 70 through line 50 to the grease tube 34. This constant pressure supply can be easily achieved by the use of an air pressure regulator on the air inlet 72 to the pump 70. The air pressure can be set to give a maximum fluid pressure output, such pump 70 pressure output being directly proportional to the air pressure supplied. In this manner a constant pressure is supplied to the grease piston 38, then a constant grease pressure supplied to the manifold 60 and from there, with all the valves open a constant grease pressure is supplied to each grease fitting on each plug valve 100. The plug valves will act like chokes at the end of the line. Due to the pressure losses along the grease lines 64, the pressure at the plug valve grease ports will be somewhat less and the pump 70 supply pressure can be adjusted such that the resistance to flow of grease through the plug valve creates a static condition of no flow of grease. Then as grease is used by the plug valves, during operations (usually when they are opened or closed), the actuation of the valve i.e. the movement breaks the grease pressure (moving friction) in the valve and the backpressure by the valve acting as a choke decreases allowing some flow of grease through the critical meatal interfaces of such plug valves into the bore of the valve displacing any fracing contaminants. Thus, automatically some grease is pumped from the grease tube, then when the valve is stationary the grease pressure will build up again (static friction) to a static holding pressure. This static holding pressure can be easily adjusted on the job location depending on the temperature conditions of the day or time of day. This enables a fully automated mode of greasing continuously during operations with all the valves 60 open and not requiring an actuation system. They can be manually closed in case of an uncontrolled grease flow or a problem with a hose or connection.

As shown in the description, a variety of variations of the embodiments of the invention have been disclosed including a practical design example. Methods of use have also been detailed. These will enable variations of the core concept to be applied within the main inventive steps by one skilled in the art.

What is claimed is:

1. A method of distributing high viscosity grease to at least one plug valve, comprising:
    loading a detachable cartridge by loading a first space within the cartridge with solid grease, the first space defined by a first wall of a piston movable within the cartridge and a first end wall of the cartridge;
    attaching the detachable cartridge to a manifold having a manifold chamber and a plurality of valves in fluid communication with the manifold chamber;
    introducing a fluid under pressure into a second space within the cartridge, the second space defined by a second opposing wall of the piston and a second end wall of the cartridge, to drive the piston and compress the solid grease within the first space of the cartridge and produce flowing grease;
    transmitting the flowing grease from the first space of the cartridge to the manifold chamber; and
    selectively opening each of the plurality of valves for distributing the flowing grease to corresponding grease ports of the at least one plug valve.

2. The method of claim 1, wherein loading the detachable cartridge comprises loading a plurality of detachable cartridges and the method further comprises selecting one of the plurality of loaded detachable cartridges for attaching to the manifold.

3. The method of claim 2, further comprising:
    determining that a detachable cartridge attached to the manifold has insufficient remaining grease within the first space of the cartridge;
    detaching the detachable cartridge attached to the manifold; and
    attaching one of the plurality of loaded detachable cartridges to the manifold.

4. The method of claim 1, wherein loading a detachable cartridge by loading a first space within the cartridge comprises loading the first space of the detachable cartridge with solid grease having a National Lubricating Grease Institute (NLGI) consistency number of at least 3.

5. The method of claim 1, wherein attaching the detachable cartridge to a manifold comprises attaching the detachable cartridge to the manifold with a hammer union coupling.

6. The method of claim 1, wherein introducing a fluid under pressure into a second space within the cartridge comprises introducing water under pressure into the second space within the cartridge.

7. The method of claim 6, wherein introducing water under pressure into the second space within the cartridge comprises:
   storing, in a vessel, a volume of water approximating a volume of solid grease in the first space of the cartridge;
   pumping water from the vessel to the second space of the cartridge; and
   approximating from the water remaining in the vessel an amount of grease that has flowed from the first space of the cartridge to the manifold chamber.

8. The method of claim 1, wherein selectively opening the plurality of valves comprises selectively opening each of the plurality of valves by air pressure actuation.

9. The method of claim 1, further comprising reducing pressure within the manifold chamber by actuating a valve in fluid communication with the manifold chamber.

10. A method of distributing high viscosity grease to at least one plug valve, comprising:
    loading a cartridge by loading a first space within the cartridge with solid grease, the first space defined by a first wall of a piston movable within the cartridge and a first end wall of the cartridge;
    attaching the cartridge to a manifold having a manifold chamber and a plurality of valves in fluid communication with the manifold chamber;
    introducing a fluid under constant pressure into a second space within the cartridge, the second space defined by a second opposing wall of the piston and a second end wall of the cartridge, to drive the piston and compress the solid grease within the first space of the cartridge and produce flowing grease;
    transmitting the flowing grease from the first space of the cartridge to the manifold chamber; and
    wherein all of the plurality of valves are open for distributing the flowing grease to corresponding grease ports of the at least one plug valve.

11. A system for distributing high viscosity grease to at least one plug valve, comprising:
    a detachable cartridge comprising:
        a body defining a chamber;
        a piston disposed within the chamber and defining a first space adapted to receive solid grease and a second opposing space for receiving fluid for driving the piston to compress the solid grease received within the first space;
        an outlet in fluid communication with the first space for providing flowing grease from the first space under compression from the piston; and
        an inlet in fluid communication with the second space for introducing fluid into the second opposing space for driving the piston; and
    a manifold for detachable coupling to the detachable cartridge and having a manifold chamber for receiving flowing grease from the outlet of the cartridge and a plurality of valves in fluid communication with the manifold chamber for selectively distributing grease from the manifold chamber to conduits for selective coupling to corresponding grease ports of the at least one plug valve.

12. The system of claim 11, wherein the manifold detachably couples to the cartridge with a hammer union coupling.

13. The system of claim 11, wherein the body of the cartridge comprises a cylinder.

14. The system of claim 11, wherein the first space of the chamber of the body is adapted to receive solid grease having a National Lubricating Grease Institute (NLGI) consistency number of at least 3.

15. The system of claim 11, wherein the fluid comprises water and the system further comprises a water system coupled by a conduit to the inlet for providing the water under pressure to the second opposing space of the chamber.

16. The system of claim 15, wherein the water system comprises:
    a vessel for holding a volume of water approximating a volume of solid grease in the first space of the chamber of the body of the cartridge; and
    a pump for a pumping water from the vessel to the second opposing space of the body of the cartridge, an amount of water pumped from the vessel approximating an amount of grease flowing from the first space of the body of the cartridge to the manifold chamber.

17. The system of claim 16, further comprising a mechanism for monitoring the amount of water pumped from the vessel.

18. The system of claim 11, wherein each of the plurality of valves is associated with a corresponding actuator for controlling operation of the valve.

19. The system of claim 18, wherein the actuator opens a corresponding valve in response to air pressure and the system further comprises a source of air pressure for controlling each of the plurality of valves.

20. The system of claim 19, wherein each of the plurality of valves closes in response to spring action.

21. The system of claim 11, wherein the manifold chamber comprises a port and the system further comprises a valve in fluid communication with the port for selectively reducing pressure from the manifold chamber.

* * * * *